US007444732B2

(12) United States Patent
Cruz et al.

(10) Patent No.: US 7,444,732 B2
(45) Date of Patent: Nov. 4, 2008

(54) METHOD FOR INSTALLATION OF GUIDE RAILS IN AN ELEVATOR SHAFT

(75) Inventors: Pablo Cruz, Saragossa (ES); Ernst Ach, Ebikon (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 11/380,463

(22) Filed: Apr. 27, 2006

(65) Prior Publication Data

US 2006/0243539 A1 Nov. 2, 2006

(30) Foreign Application Priority Data

Apr. 27, 2005 (EP) ................................. 05103475

(51) Int. Cl.
*B23P 11/00* (2006.01)
*B66B 7/02* (2006.01)

(52) U.S. Cl. .................................... 29/525.01; 187/408

(58) Field of Classification Search .............. 29/525.01, 29/525.02, 423, 418, 428; 52/745.2, 30; 187/408; 198/706
See application file for complete search history.

(56) References Cited

U.S. PATENT DOCUMENTS

| | | | | |
|---|---|---|---|---|
| 3,500,494 | A * | 3/1970 | Kopp et al. | 452/183 |
| 3,851,736 | A | 12/1974 | Westlake et al. | |
| 4,345,671 | A | 8/1982 | Tosado et al. | |
| 4,944,387 | A * | 7/1990 | Burke | 198/706 |

FOREIGN PATENT DOCUMENTS

| | | | |
|---|---|---|---|
| DE | 2059331 | * | 3/1978 |
| JP | 1321291 | | 12/1989 |
| JP | 4066485 | | 3/1992 |
| JP | 6255943 | | 9/1994 |
| NZ | 0546305 | | 9/2006 |
| WO | WO 9829325 | | 7/1998 |

* cited by examiner

*Primary Examiner*—John C Hong
(74) *Attorney, Agent, or Firm*—Fraser Clemens Martin & Miller LLC; William J. Clemens

(57) ABSTRACT

A device and method for installing guide rails in an elevator shaft includes a common support to line up the guide rails as an assembly. At least one coupling element per guide rail is provided in order to fasten the guide rails to the support. The common support is designed so that the guide rails can be fastened one after the other to the common support.

16 Claims, 4 Drawing Sheets

METHOD FOR INSTALLATION OF GUIDE RAILS IN AN ELEVATOR SHAFT

BACKGROUND OF THE INVENTION

The present invention relates to a method as well as a device for the installation of guide rails in an elevator shaft.

Guide rails are means for guidance of the elevator car or the counterweight within an elevator shaft. The guide rails enable a controlled vertical movement through acceptance of horizontal forces. The elevator car or the counterweight is connected with the guide rails by wheels or slide parts which are fastened to, for example, the sides of the elevator car or the counterweight. Several lines of guide rails can also be present depending on the respective size and use of the elevator. The counterweight can, since normally no horizontal forces occur, also be guided by guide rails in the form of an enclosure.

The installation of guide rails in an elevator shaft is, due to the length and weight of the individual elements, a time-intensive and difficult operation which is usually carried out in small increments. The transport of the individual guide rail elements within the elevator shaft to an intended location usually takes place with the help of a mounting platform. In that case each element usually has to be brought from the ground floor to its intended location in the elevator shaft.

JP 05178561A discloses a method in which several guide rails can be drawn into the elevator shaft in one working step. The individual guide rails are in that case connected together by way of couplings, which each consist of a joint, and pulled up in the elevator shaft. Each coupling then bears the weight of the all guide rails and couplings hanging thereunder.

An object of the present invention is to make available a device and a method for more efficient installation of guide rails in an elevator shaft.

SUMMARY OF THE INVENTION

The present invention teaches a method and a device for installing guide rails in an elevator shaft. In that case, several guide rails are each mechanically fastened by at least one coupling element to a common support means. The guide rails lined up one after the other at the common support means as a composite are conveyed by conveying means into the elevator shaft. In that case the guide rails hanging one after the other individually at the support means adopt a substantially vertical position during pulling up of the support means in the elevator shaft.

This has the advantage that a plurality of guide rails or all guide rails of a line can be drawn into the elevator shaft in one working step. Through connection of the individual guide rails with the support means the guide rails can be pulled up in the elevator shaft in one working step by one person with the help of the conveying means (for example a block and tackle and/or motor). It is also conceivable that the guide rails hanging at the support means are introduced into the elevator shaft from above by a hoisting device independent of the elevator shaft, such as, for example, a building crane. Costs for the mounting of the guide rails in an elevator shaft can thereby be reduced.

Advantageously the guide rails are fastened to the common support means prior to delivery. This has the advantage that the risk of mixing up the different types of guide rails at the installation location of the guide rails in the elevator shaft is diminished. Through fixing the succession of individual guide rails in the elevator shaft prior to delivery the guide rails can be supplied with elements such as, for example, sensors already pre-installed and/or integrated in the guide rails.

According to another embodiment of the present invention the guide rails can be fastened to the common support means also after delivery. The fastening can in that case be carried out in preparation in that the support means is connected by means of the coupling elements with the guide rails lying on a stack or the guide rails are fastened to the common support means during pulling up of the support means in the elevator shaft. This has the advantage that the guide rails can be handled individually. The assembly personnel can in that case decide on site how many guide rail elements are to be drawn into the elevator shaft in one working step and in which sequence.

Advantageously the guide rails are drawn into the elevator shaft by conveying means. Preferably conveying means (motor, deflecting roller, block-and-tackle) fastened to the shaft ceiling are used for this purpose. This has the advantage that the guide rails at the common support means can be drawn into the elevator shaft by one person with little expenditure of force. As mentioned, external conveying means (for example, a building crane) can also be used.

Advantageously, mounting of the guide rails in the lower region of the elevator shaft is begun. After installation of the first guide rails a mounting platform (for example, the elevator car or a part of the same) can be introduced into the elevator shaft and displaced upwardly so that further guide rails of the composite can be mounted. This has the advantage that a mounting platform serving for installation of the guide rails can be moved from below in an upward direction along the already mounted guide rails. In that case the guide rails hanging in a vertical position one after the other individually at the support means are fastened in succession. Due to the fact that the guide rails following the mounting step already hang at their approximate position an efficient operation is made possible. The mounting platform is preferably equipped with necessary safety devices which, for example, limit the travel speed of the mounting platform, prevent crashing down of the same or in the case of need can also be used for arresting the mounting platform.

Advantageously at least a part of the guide rails to be used—for example all guide rails of a mounting section—are suspended with the help of the support means in the elevator shaft before mounting of the guide rails at the shaft wall is commenced. This has the advantage that individual guide rail elements do not have to be picked up each time at a storage location, for example at the ground floor. A mounting section can contain all guide rails of a line or it can contain a part of the guide rails of a line. In addition, it is possible to mount more than one mounting section of the elevator car or more than one mounting section of the counterweight at the shaft wall in one working step.

Advantageously the coupling elements and the support means are removed after mounting of the guide rails on the shaft wall. This has the advantage that the coupling elements and the support means can be used several times.

Advantageously the device for installation of the guide rails in the elevator shaft comprises means enabling installation of guide rails for the elevator car and/or guide rails for the counterweight. This has the advantage that not only the guide rails for the elevator car, but also the guide rails for the counterweight can be efficiently mounted in the elevator shaft. Working steps which are similar in each instance can then be routinely executed with identical tools.

An embodiment of the support means according to the present invention in which the coupling elements are already premounted on the guide means at a suitable spacing is particularly preferred. This has the advantage that the guide rails only still have to be connected with the support means by means of the coupling elements, which takes place quickly and is simple.

Advantageously the support means is a cable or a chain, the length of which amounts to a multiple of a guide rail. This has the advantage that several guide rails can be drawn into the elevator shaft in one working step at the non-rigid support means. Due to the fact that the length of the support means is a multiple of the guide rails several guide rails can be drawn into the elevator shaft as a unit and in succession in one working step.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
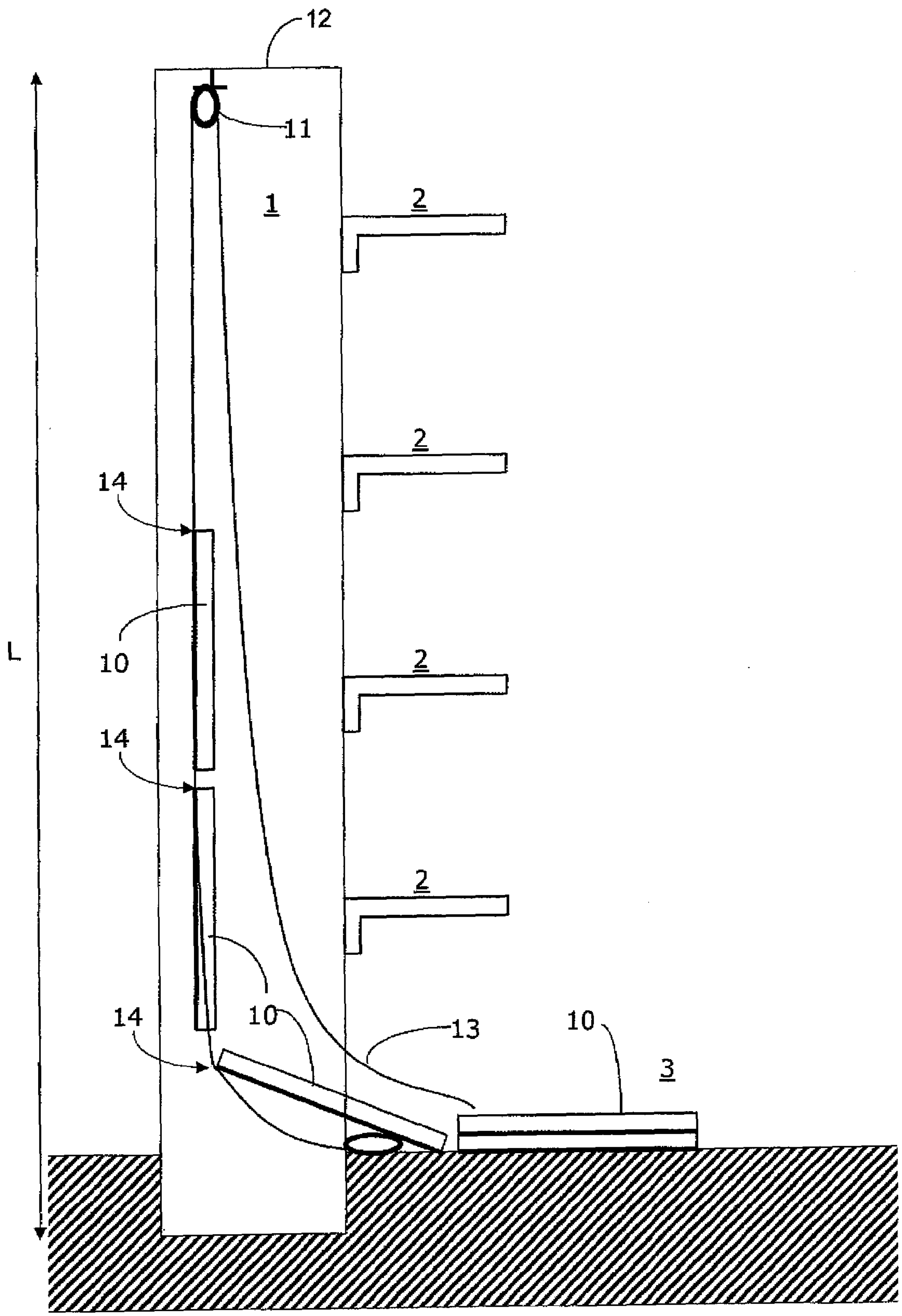
FIG. 1 is a schematic elevation view of a first embodiment of an elevator shaft with guide rails being installed according to the present invention.

FIG. 1 shows a typical elevator shaft 1 which is arranged in or at a building or construction shell and is provided for at least one elevator. The shaft can be any desired known elevator shaft 1 provided for vertical transport of passengers or goods between floors 2 of the building. The elevator shaft 1 can be separated from the floors 2 by doors (not shown).

Guide rails 10 make it possible to hold the elevator car (not shown) in the region of a predetermined horizontal sectional area of the elevator shaft 1. The wheels or slide parts, which are fastened to the outer side of the elevator car, roll or slide along the guide rails 10. Forces with horizontal force vectors arise due to the usually asymmetrical loading of the elevator car. These forces are transmitted by the wheels or the slide parts to the guide rails 10. The guide rails 10 typically consist of individual elements which are approximately of two and one half to five meters in length and which are lined up to form lines. Several lines for guidance of the elevator in the shaft 1 can also be present depending on the respective size, weight and use of the elevator.

A counterweight (not shown) which similarly moves up and down in the elevator shaft 1 is usually guided by the guide rails 10 similarly by means of wheels or slide parts. Since in the case of the counterweight no large asymmetrical loads arise, the guide rails 10 are known which merely enclose the counterweight as a boundary frame and thereby prevent larger horizontal movements of the counterweight.

In order to draw the individual elements of the guide rails 10 into the elevator shaft 1 use is made, according to the present invention, of a common support means 13. The common support means 13 is drawn into the elevator shaft 1 by a conveying means 11 (for example, a deflecting roller, a block-and-tackle or a motor, or a suitable combination of these components), which advantageously are fastened to a shaft ceiling 12. It is also conceivable for the guide rails 10 hanging at the support means 13 to be introduced into the elevator shaft 1 by a lifting device, such as, for example, a building crane, arranged at a distance from the elevator shaft 1.

Depending on the respective conveying means 11 used for drawing in the support means 13 the support means 13 should amount to a multiple of a vertical length L of the elevator shaft 1. Thus, for example, in the case of use of a deflecting roller as the conveying means 11 the support means 13 should have at least three times the length L of the elevator shaft 1. Twice the elevator shaft length L is needed in order to be able to install the support means 13 unloaded. At a third of the elevator shaft length L of the support means 13 the guide rails 10 are mounted.

The support means 13 itself can be realized in various forms. Thus, for example, it can be a rope, cable, chain or belt. In addition, a variety of materials are conceivable for the material from which the support means 13 is made. For example, the support means 13 can be made of iron, steel, plastic material or natural fibers. It can also be a combination of different materials.

Different embodiments are possible for a plurality of coupling elements 14 according to the present invention. The coupling elements 14 in that case have to be designed so that they can reliably connect and bear the weight of one of the guide rails 10 with the support means 13. It is then to be observed that separation of the connection and thus removal of the coupling element 14 from the guide rail 10 should be possible with the smallest amount of effort after mounting of the guide rails 10 in the elevator shaft 1. Advantageously, the coupling element 14 can also be reusable.

The support means 13 is preferably supplied with premounted coupling elements 14. The coupling elements 14 can be fixedly mounted on the support means 13 or be demountable.

The term "assembly personnel" is used in the present context to describe persons who mount an elevator installation in the elevator shaft 1 and/or prepare it for mounting in the elevator shaft 1. The elevator installation is assembled from the supplied means. In that case the guide rails 10 are mounted in the elevator shaft 1, the elevator car installed, connections for operation of the elevator undertaken, etc. The assembly personnel can be composed of expert workers and/or auxiliary persons.

Figure 1A:
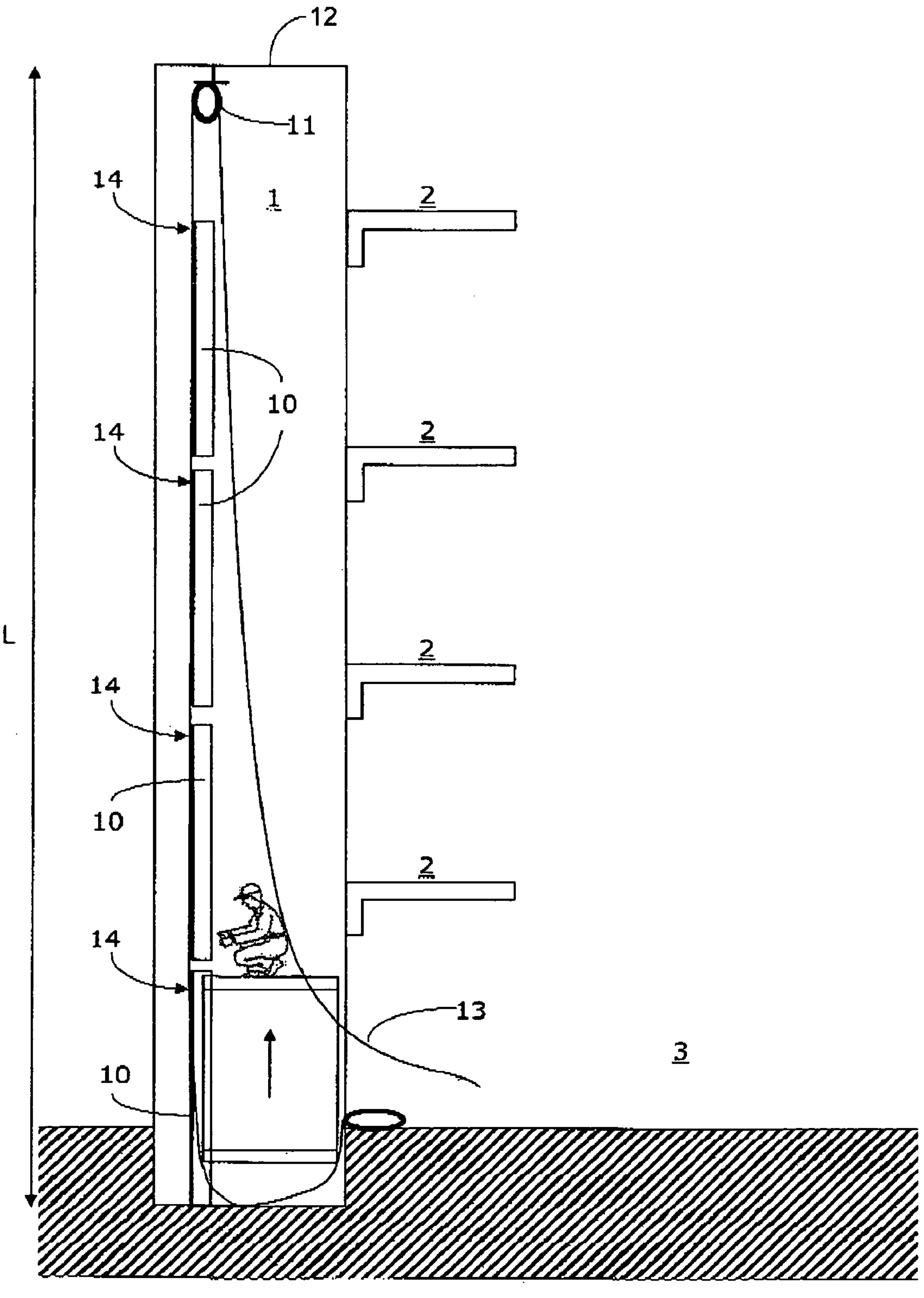
FIG. 1*a* is a schematic elevation view similar to FIG. 1 showing the guide rails being installed according to the present invention.

The mounting platform 15 is preferably the elevator car itself (shown in FIG. 1*a*) or parts of the elevator car which at the time of installation of the guide rails 10 are already present in the elevator shaft 1 or installed towards this time. However, it can also comprise means which are partly or completely demounted prior to later installation of the actual elevator. The mounting platform is movable in the elevator shaft. Mounting of elevator elements in the shaft 1 is simplified for the assembly personnel by the mounting platform. Elements of the elevator installation, tools and assembly personnel can be conveyed up and down in the elevator shaft on the mounting platform. The assembly personnel can then execute mounting procedures at an advantageous working height.

Mounting of the guide rails 10 takes place at their intended location. Depending on the respective kind of guide rails 10 not only the line, but also the position within the line for an individual element is predetermined for the individual elements. Through the lining up of the guide rails 10 at the support means 13 the association of the guide rails 10 can be established in more agreeable working conditions than in a confined and dark elevator shaft 1. The risk of confusion of the different types of guide rails 10 and the risk of individual guide elements being mounted at an incorrect intended location are thus reduced.

The means required for mounting of an elevator are introduced into the elevator shaft 1 from at least one storage location 3. The storage location 3 is preferably disposed at the ground floor of the elevator shaft 1, because the means required for the elevator can usually be delivered particularly easily to the ground floor. However, it is also conceivable for further storage locations 3 to be added at higher or lower floors 2.

Figure 2:
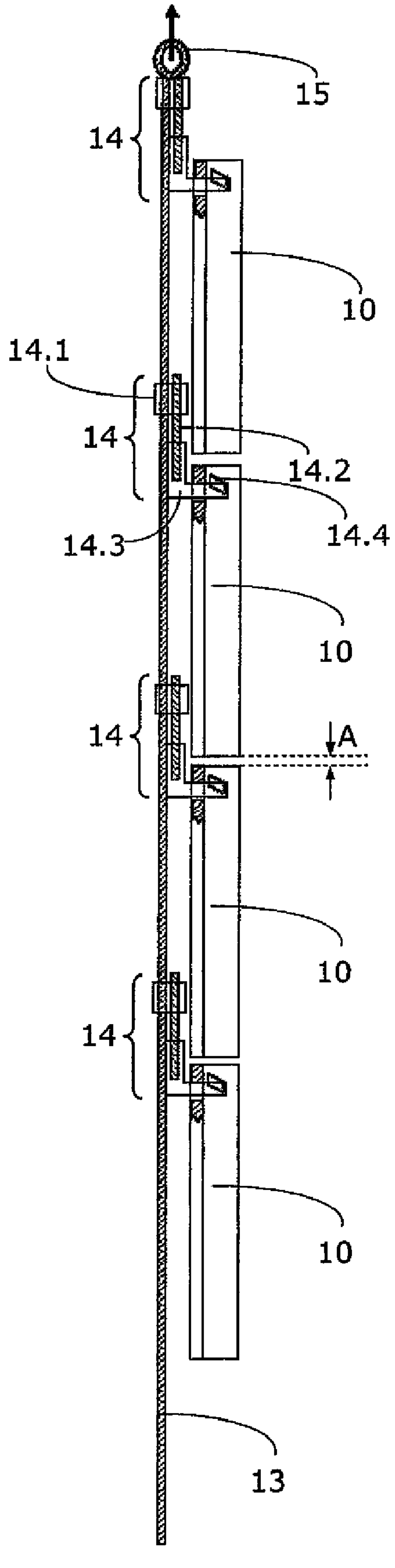
FIG. 2 is a schematic cross-sectional view of a first embodiment of a coupling of a guide rail to a support means according to the present invention.

An assembly with several guide rails 10 is shown in FIG. 2. Each of the guide rails 10 is fastened to the support means 13 by an associated one of the coupling elements 14. In the illustrated example, four of the guide rails 10 are suspended one after the other vertically at the support means 13 in the elevator shaft.

The coupling elements 14 can, as shown in FIG. 2, be fastened to the support means 13 by a clamping or screw element 14.1. The coupling element 14 comprises a run 14.2 which is fastened to the clamping or screw element 14.1 and extends parallel to the support means 13. Provided at a lower end of the run 14.2 is a safety hook 14.3 which engages through a passage opening at the guide rail 10 and thus connects the guide rail 10 with the support means 13. In order to prevent slipping of the guide rail 10 from the safety hook 14.3 this can be equipped with, for example, a resiliently mounted lug 14.4 which in the manner of a barb prevents slipping out of the passage opening. The passage opening is preferably disposed at a place of the guide rail 10 which does not obstruct running along of the wheels or the slide parts of the elevator car or the counterweight. Advantageously, passage openings of the guide rails 10 used for joining together guide rails are employed. This has the advantage that no further passage openings have to be formed and thus commercially available guide rails can be used.

The support means 13 is preferably a solid steel cable. A galvanized embodiment of the support means 13 is particularly preferred.

An eye 15 or the like can be provided at the upper end of the support means 13 in order to be able to connect the support means with the conveying means 11.

A spacing A between two of the guide rails 10 hanging in succession at the support means preferably amounts to between five millimeters and one hundred millimeters. Damage of the guide rail ends is thereby precluded, since they do not hit against one another.

A length of the run 14.2 between two hundred millimeters and one thousand millimeters has proved appropriate in order to impart to the coupling element according to FIG. 2 the requisite flexibility to enable problem-free drawing into the shaft.

Figure 3:
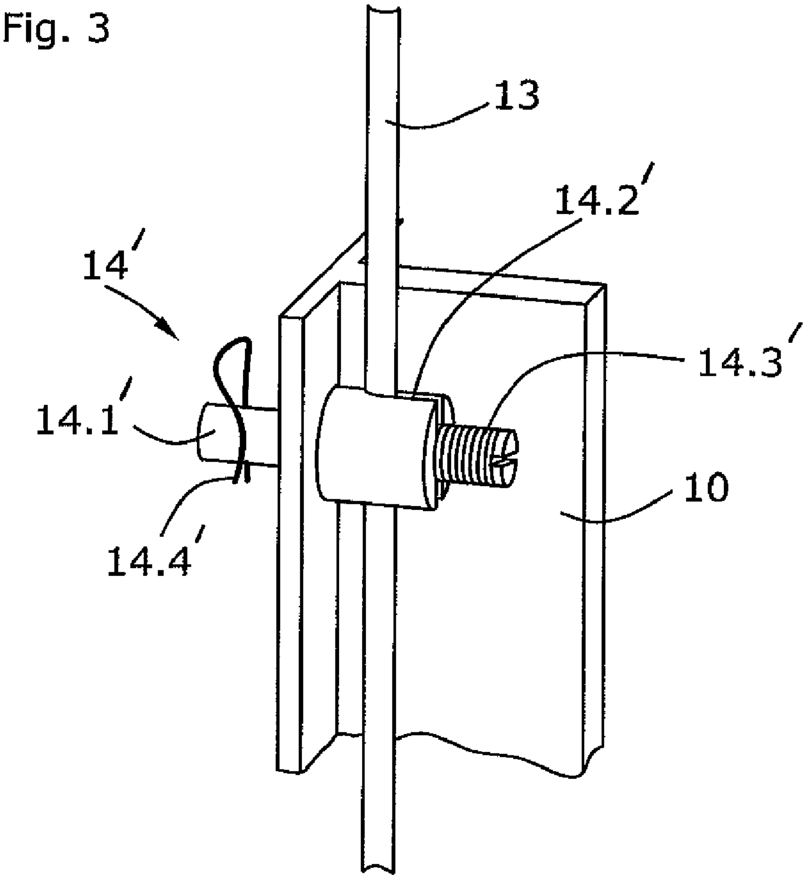
FIG. 3 is a schematic perspective view of a second embodiment of a coupling of a guide rail to a support means according to the present invention.

A further embodiment of a coupling element 14' is shown in FIG. 3. The upper end of the guide rail 10 can be recognized in FIG. 3. A passage opening is provided at one limb of the guide rail 10. A pin 14.1', on which a cylindrical means 14.2' for fixing the support means 13 is provided, is inserted through this passage opening. The means 14.2' for fixing the support means comprise a screw 14.3'. The support means 13 is clamped in place by tightening the screw 14.3' and the coupling 14' can no longer slip along the support means 13. The pin 14.1' is, as mentioned, inserted by one end through the passage opening and can be secured by a split pin 14.4' or a similar securing element.

Figure 4:
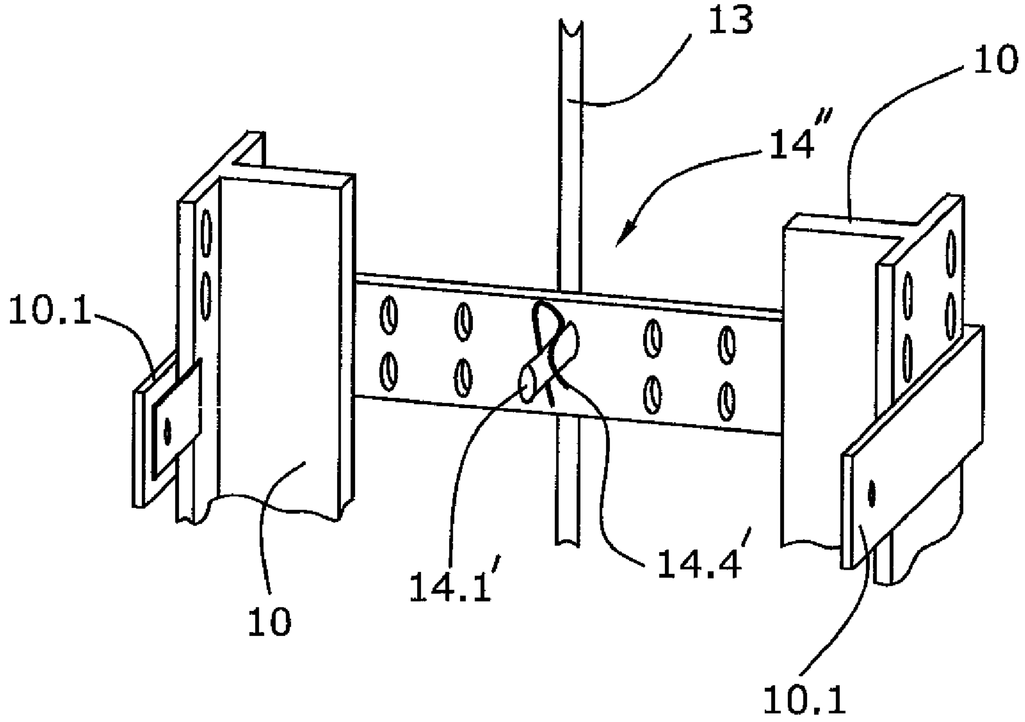
FIG. 4 is a schematic perspective view of a further embodiment of a coupling element for a premounted guide rail component to a support means according to the present invention.

A further embodiment of the invention is indicated in FIG. 4. A schematic view of the further embodiment of a coupling element 14" is shown. In the illustrated example of embodiment two of the guide rails 10 form a premounted guide rail component (this guide rail component is, for the sake of simplicity, also termed guide rail). The two guide rails 10 can be connected together by, for example, one or more transverse elements 10.1. The transverse element 10.1 can, for example, be directly used for fastening the guide rails 10 to a shaft wall. The coupling element 14" in this case engages centrally at the transverse element 10.1. For this purpose the transverse element 10.1 has a slot through which a part of the coupling element 14" projects. The coupling element 14" can, similarly to that shown in FIG. 2, comprise the securing element 14.4' in order to prevent slipping down of the guide rails. The guide rail or the guide rail component as well as further guide rails following thereon then hang in the elevator shaft substantially vertically at the common support means 13.

Advantageous combinations are possible; thus, for example, a part region of the guide rails, for example a first or the lowermost guide rail 10 of a line, can be mounted in a known conventional manner and the remaining rails can be drawn into the shaft by means of the common support means 13. This has the advantage that a mounting platform where applicable can be mounted directly after mounting of the lowermost guide rails.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for installing guide rails in an elevator shaft, wherein the guide rails are conveyed as an assembly one after the other in the elevator shaft, comprising the steps of:

a. fastening several guide rails one after the other to a common support means as the assembly in which each of the guide rails is mechanically connected with the support means by at least one coupling element; and b. pulling the support means inclusive of the guide rails connected therewith up the elevator shaft, wherein the guide rails hang individually at the support means one after the other and adopt a substantially vertical position and form one substantially vertical line in the elevator shaft and the support means carrying the individual guide rails extends over a major length of the guide rail assembly and is substantially in parallel with the guide rail assembly and each of said at least one coupling elements supports only one of said guide rails.

2. The method according to claim 1 including performing said step a. by one of:

fastening the guide rails to the common support means before delivery;

fastening the guide rails to the common support means after delivery and before pulling the support means up the elevator shaft; and fastening the guide rails to the common support means after delivery and during the pulling up of the support means.

3. The method according to claim 1 including performing said step b. by one of:

drawing the guide rails into the elevator shaft with a conveying means fastened to or in the region of a ceiling of the elevator shaft; and drawing the guide rails into the elevator shaft with an external conveying means.

4. The method according to claim 1 including further steps of:

mounting a first one of the guide rails of the assembly in a lower region of the elevator shaft;

displacing a mounting platform upwardly in the elevator shaft along the first one of the guide rails; and mounting a second one of the guide rails of the assembly in the elevator shaft wherein an elevator car or a part of an elevator car serves as the mounting platform for mounting the guide rails of the assembly.

5. The method according to claim 1 including a step of hanging at least one of the guide rails in the elevator shaft using the common support means before commencing mounting of the remaining guide rails of the assembly at a shaft wall of the elevator shaft.

6. The method according to claim 1 including removing the coupling elements and the common support means from the elevator shaft after mounting the guide rails at a shaft wall of the elevator shaft.

7. The method according to claim 1 wherein a spacing between two of the guide rails hanging in succession at the support means is between five millimeters and one hundred millimeters and wherein the at least one coupling element is clamped to the support means in a demountable manner.

8. The method according to claim 7 wherein the at least one coupling element is clamped by a clamping screw.

9. The method according to claim 1 wherein the at least one coupling element is connected, for conveying the guide rails in the elevator shaft, at an upper end of an associated one of the guide rails using a passage opening of the associated guide rail and the at least one coupling element is secured to the associated guide rail.

10. The method according to claim 9 wherein the at least one coupling element is secured to the associated guide rail by a split pin.

11. A method for installing guide rails in an elevator shaft, wherein the guide rails are conveyed as an assembly one after the other in the elevator shaft, comprising the steps of:

a. fastening several guide rails individually to a common support means as the assembly in which each of the guide rails is mechanically connected with the support means by at least one coupling element; and b. pulling the support means inclusive of the guide rails connected therewith up the elevator shaft, wherein the guide rails hang individually at the support means one after the other and form a substantially vertical line in the elevator shaft. the support means carrying the individual guide rails being substantilly in parallel with the assembly of guide rails and each of the at least on coupling elements supports a single one of the guide rails wherein the at least one coupling elements are arranged at a distance on the support means to space two of the guide rails hanging in succession at the support means.

12. The method according to claim 11 wherein the spacing between the two of the guide rails hanging in succession at the support means is between five millimeters and one hundred millimeters and wherein the at least one coupling element is clamped in a demountable manner.

13. The method according to claim 12 wherein the at least one coupling element is clamped by a clamping screw.

14. The method according to claim 11 wherein the at least one coupling element is connected, for conveying the guide rails in the elevator shaft, at an upper end of an associated one of the guide rails using a passage opening of the associated guide rail and the at least one coupling element is secured to the associated guide rail.

15. The method according to claim 14 wherein the at least one coupling element is secured to the associated guide rail by a split pin.

16. A method for installing guide rails in an elevator shaft, wherein the guide rails are conveyed as an assembly one after the other in the elevator shaft, comprising the steps of:

a. fastening several guide rails one after the other to a common support means as the assembly in which each of the guide rails is mechanically connected with the support means by at least one removable coupling element;

b. pulling the support means inclusive of the guide rails connected therewith up the elevator shaft, wherein the guide rails hang individually at the support means one after the other and adopt a substantially vertical position and form one substantially vertical line in the elevator shaft and the support means carring the individual guide rails extends over a major length of the guide rail assembly and is substantially in parallel with the guide rail assembly and each of the at least one removable coupling elements supports only one of the guide rails; and c. removing the at least one removalbe coupling elements from the guide rails while the guide rails are mounted at a shaft wall of the elevator shaft.

* * * * *